United States Patent
Naccache

(10) Patent No.: US 10,693,854 B2
(45) Date of Patent: Jun. 23, 2020

(54) METHOD FOR AUTHENTICATING A USER, CORRESPONDING SERVER, COMMUNICATIONS TERMINAL AND PROGRAMS

(71) Applicant: INGENICO GROUP, Paris (FR)

(72) Inventor: David Naccache, Paris (FR)

(73) Assignee: INGENICO GROUP, Paris (FR)

( * ) Notice: Subject to any disclaimer, the term of this patent is extended or adjusted under 35 U.S.C. 154(b) by 90 days.

(21) Appl. No.: 14/968,231

(22) Filed: Dec. 14, 2015

(65) Prior Publication Data

US 2016/0173473 A1 Jun. 16, 2016

(30) Foreign Application Priority Data

Dec. 12, 2014 (FR) ...................................... 14 62382

(51) Int. Cl.
*G06F 7/04* (2006.01)
*G06F 15/16* (2006.01)
(Continued)

(52) U.S. Cl.
CPC ........... *H04L 63/08* (2013.01); *G06Q 20/401* (2013.01); *H04L 63/0853* (2013.01); *H04W 4/80* (2018.02);
(Continued)

(58) Field of Classification Search
CPC . H04L 63/0853; H04L 9/3234; H04L 9/3276; H04L 63/08; H04L 9/3271;
(Continued)

(56) References Cited

U.S. PATENT DOCUMENTS

| 2009/0287921 A1* | 11/2009 | Zhu | G06Q 10/02 713/155 |
| 2010/0058064 A1* | 3/2010 | Kirovski | H04L 9/3073 713/176 |

(Continued)

OTHER PUBLICATIONS

Jeremie Albert, Tegawende F. Bissyande, Yerom-David Bromberg, Serge Chaumette and Laurent Reveillere, UbiPAN: A Bluetooth Extended Personal Area Network, 2010 International Conference on Complex, Intelligent and Software Intensive Systems (Year: 2010).*

(Continued)

*Primary Examiner* — Trong H Nguyen
*Assistant Examiner* — Amie C. Lin
(74) *Attorney, Agent, or Firm* — David D. Brush; Westman, Champlin & Koehler, P.A.

(57) ABSTRACT

A method is provided for authenticating a user's communications terminal with an authentication server connected to a gateway terminal by using a communications network. The method includes: obtaining a piece of data representing an identity of the user from the gateway terminal; configuring, by the authentication server, a data transmission link between the authentication server and the terminal, using a predefined data transmission interface of the gateway terminal and as a function of the piece of data representing the identity of the user; transmitting, by the authentication server, to the terminal, a piece of encrypted data for checking authentication, using the data transmission link; receiving, by the authentication user, coming from the terminal, a piece of encrypted data for counter-checking authentication; issuing an assertion of authentication of the user when the piece of data for the counter-checking of authentication corresponds to the piece of data for checking authentication.

7 Claims, 2 Drawing Sheets

Figure 1:
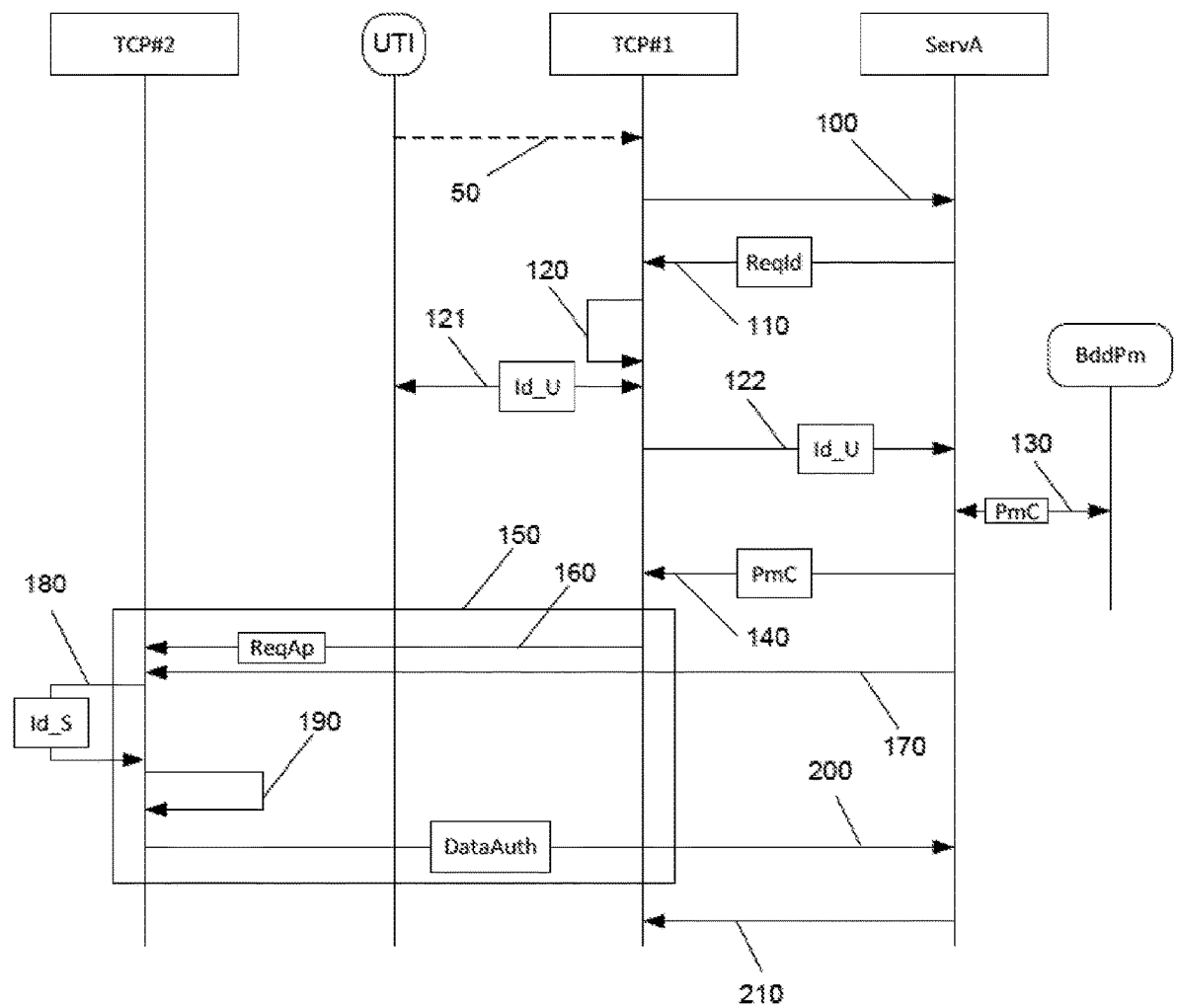

(51) Int. Cl.
*G06F 17/30* (2006.01)
*H04L 29/06* (2006.01)
*H04W 4/80* (2018.01)
*G06Q 20/40* (2012.01)
*H04W 12/06* (2009.01)

(52) U.S. Cl.
CPC ......... *H04W 12/06* (2013.01); *H04L 63/0884* (2013.01); *H04L 63/18* (2013.01)

(58) Field of Classification Search
CPC ... H04L 9/3273; H04L 63/0884; H04L 63/18; H04W 4/008; H04W 12/06; G06Q 20/401
See application file for complete search history.

(56) References Cited

U.S. PATENT DOCUMENTS

| | | | |
|---|---|---|---|
| 2011/0265159 A1* | 10/2011 | Ronda | H04L 63/0853 726/6 |
| 2014/0007211 A1* | 1/2014 | Yang | H04L 63/08 726/7 |
| 2014/0096220 A1 | 4/2014 | Da Cruz Pinto et al. | |
| 2015/0172920 A1* | 6/2015 | Ben Ayed | H04L 63/0853 713/172 |

OTHER PUBLICATIONS

French Search Report and Written Opinion dated Jul. 23, 2015 for corresponding French Application No. FR1462382, filed Dec. 12, 2014.
English translation of the French Written Opinion for corresponding French Application No. FR1462382, filed Dec. 12, 2014.

\* cited by examiner

METHOD FOR AUTHENTICATING A USER, CORRESPONDING SERVER, COMMUNICATIONS TERMINAL AND PROGRAMS

CROSS-REFERENCE TO RELATED APPLICATIONS

This application claims priority to and the benefit of French Patent Application No. FR 1462382, filed Dec. 12, 2014, the content of which is incorporated herein by reference in its entirety.

FIELD OF THE DISCLOSURE

The disclosure relates to the field of the authentication of users. More particularly, the disclosure relates to the field of the authentication of users in relation to services such as services for access to confidential information or again payment services.

PRIOR ART

The authentication of users in relation to services and more particularly online services is a source of problems. As a rule, the authentication of a user requires, on the one hand, the entry of a login type identifier by which the user's identity is communicated and the entry of a password (or a personal identification code) to make sure that the person is really the one who he claims to be. In fact, such systems make sure of only one thing: that the person who identifies himself with an identifier (which is not necessarily his) also has the password corresponding to this identifier. At no time, with these systems, is it certain that the user is truly the one whom he claims to be.

Besides, in addition to an identifier, the user must often remember a password, and this is a problem. Indeed, to avoid having too many passwords, many users use the same password for all the services (electronic mail services, services for storing files on a common storage space, access to bank accounts, etc.). Other users, who are even less prudent, use extremely simple passwords, such as "qwerty" or "password". In this example, it is obvious that such a password is practically useless.

Paradoxically, the users want authentication devices that perform well because they do not wish their electronic messaging services or their bank accounts to be hacked into. However, since a user is either resistant or knows little about problems of identity theft and problems of hacking, he is generally the weak link in an authentication system.

Many techniques have been proposed to overcome problems of authentication and user friendliness in authentication. These include especially the use of smartcards, in certain examples, or again the use of tokens (physical devices enabling a generation of random passwords). However, although these systems perform well from the viewpoint of authentication strength, they are nevertheless not user friendly: the user always has to enter an identifier and/or a password and in most cases he has to enter both these pieces of information.

There are systems used to enter only one existing password: the entry of the identifier is done in other ways. The best known system is the cookie, a small text file recorded by a web browser when the web server asks for it: in this system, the user enters his identifier only once (during his first connection to the service). Thereafter, during subsequent connections to the service, only the password must be entered. Other systems exist enabling the entry of only a password: these are for example systems based on the use of smartcards or communications terminals (comprising identification data) which make it possible to do without the entry of an identifier. Such systems nevertheless require the entry of a password. Besides, this is preferable because it is not reassuring to enable a device, however secured it may be, to completely authenticate a user.

All the same, the fact is that the general problems and issues related to authentication pose a considerable problem of user friendliness which impairs the security of the system.

SUMMARY

An exemplary embodiment of the present disclosure relates to a method for authenticating a communications terminal belonging to a user with an authentication server connected to a gateway terminal by means of a communications network. Such a method comprises, within the authentication server:
- a step for obtaining a piece of data representing an identity of the user from said gateway terminal;
- a step of configuration, by said authentication server, of a data transmission link between said authentication server and said user's communications terminal by means of a predefined data transmission interface of said gateway terminal and as a function of said piece of data representing an identity of the user;
- a step of transmission, by the authentication server to the user's communications terminal, of a piece of encrypted data for checking authentication, by means of the data transmission link;
- a step of reception, by the authentication server, coming from the user's communications terminal, of a piece of encrypted data for the counter-checking of authentication;
- a step of issuing an assertion of authentication of the user when the piece of data for the counter-checking of authentication corresponds to said piece of data for checking authentication.

According to one particular characteristic, the predefined data transmission interface of said gateway terminal is a Bluetooth interface and the data transmission link between the authentication server and the user's communications terminal is a virtual Bluetooth link.

According to one particular characteristic, prior to the step for obtaining a piece of data representing an identity of the user, said method comprises:
- a step for receiving a request for connection from said gateway terminal or from a server connected to said authentication server; and
- a step of transmission, to said gateway terminal, of a request for identification as a function of said request for connection.

According to one particular characteristic, the step of configuration by said authentication server of a data transmission link between said authentication server and said user's communications terminal comprises:
- a step for obtaining at least one piece of data representing at least one parameter of connection to the communications terminal, by means of said piece of data representing said identity of the user;
- a step of transmission of said at least one piece of data representing a parameter of connection to said gateway terminal.

According to one particular characteristic, said at least one parameter of connection comprises at least one piece of data necessary for the building of the link between the communications terminal of the user and the gateway terminal.

According to one particular characteristic, said at least one parameter of connection comprises at least one piece of data belonging to the group comprising:
  a physical address of the user's communications terminal;
  a piece of data of the pairing code type;
  a piece of data of the password type.

According to another embodiment, the technique also relates to a server for authenticating a communications terminal belonging to a user with an authentication server connected to a gateway terminal by means of a communications network. Such a server comprises:
  a module configured to obtain a piece of data, from said gateway terminal, representing an identity of the user;
  a module configured to configure a data transmission link between said authentication server and said user's communications terminal by means of a predefined data transmission interface of said gateway terminal and as a function of said piece of data representing an identity of the user;
  a module configured to transmit, to the user's communications terminal a piece of encrypted data for checking authentication by means of the data transmission link;
  a module configured to receive a piece of encrypted data for the counter-checking of authentication from the user's communications terminal;
  a module configured to issue an assertion of authentication of the user when the piece of data for the counter-checking of authentication corresponds to said piece of data for checking authentication.

According to another aspect, the technique as proposed relates also to an intermediate terminal and a user's communications terminal. Each of these two terminals comprises means for implementing steps of the method that concerns it and especially means for creating a wireless connection in order to set up a secured link between the communications terminal and the authentication server. The methods implemented described here below are then complementary to the method of authentication at the authentication server level.

According to a preferred implementation, the different steps of the method according to an exemplary embodiment of the disclosure are implemented by one or more software programs or computer programs that comprise software instructions to be executed by a data processor of a relay module according to an embodiment of the disclosure and are designed to command the execution of the different steps and methods.

The proposed technique is therefore also aimed at providing a program capable of being executed by a computer or a data processor, this program comprising instructions to command the execution of the steps of a method as mentioned here above.

This program can use any programming language whatsoever and can be in the form of a source code, object code or intermediate code between source code and object code, such as in a partially compiled form or in any other desirable form.

The disclosure is also aimed at providing an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by a radio or by other means. The program according to the proposed technique can especially be uploaded to an Internet type network.

As an alternative, the information carrier can be an integrated circuit into which the program is incorporated, the circuit being adapted to execute or to be used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here above for the module concerned. Such a software component is executed by a data processor of a physical entity (terminal, server, gateway, router, etc) and is capable of accessing the hardware resources of this physical entity (memories, recording media, communications buses, input/output electronic boards, user interfaces, etc).

In the same way, a hardware component corresponds to any element of a hardware unit capable of implementing a function or a set of functions as described here above for the module concerned. It can be a programmable hardware component or a component with an integrated processor for the execution of software, for example an integrated circuit, a smartcard, a memory card, an electronic board for the execution of firmware, etc.

Each component of the previously described system naturally implements its own software modules.

The different embodiments mentioned here above can be combined with each other to implement the proposed technique.

FIGURES

Figure 2:
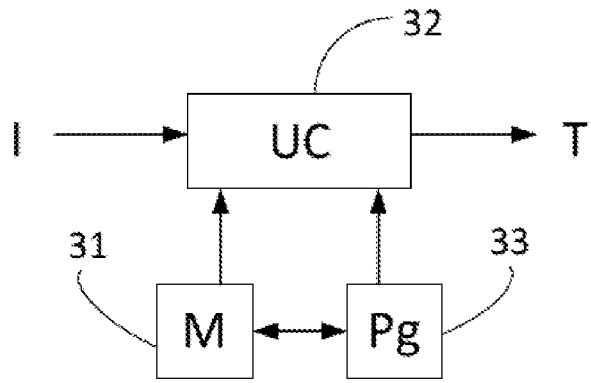
Figure 3:
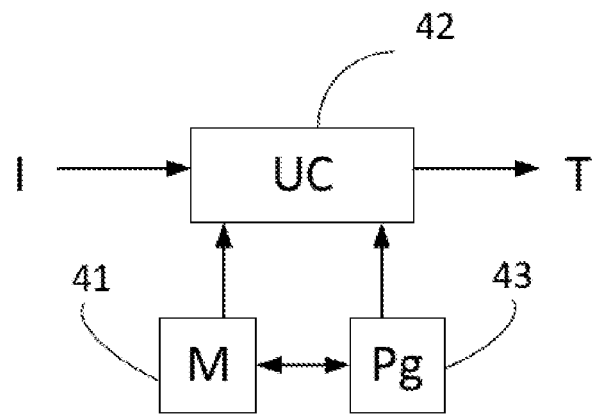
Figure 4:
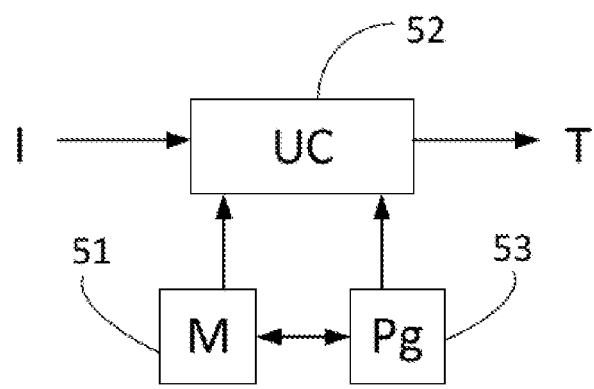

Other features and advantages of the proposed technique shall appear more clearly from the following description of a preferred embodiment, given by way of a simple illustratory and non-exhaustive example and from the appended drawings, of which:

FIG. 1 is a block diagram of the proposed technique from a general viewpoint bringing into play the terminals and the authentication server;

FIG. 2 describes an authentication server according to the proposed technique;

FIG. 3 describes a user's communications terminal capable of implementing the proposed technique;

FIG. 4 describes a gateway terminal capable of implementing the proposed technique.

DESCRIPTION

6.1. General Reminder of the Principle

As explained here above, the general principle of the proposed technique lies in the use of a communications terminal, the user's own terminal, to carry out an operation of authentication using another terminal. More particularly, the principle consists in initiating a pairing between a communications terminal of the user (for example a telephone) and an authentication server via another communications terminal of the user (for example a computer). According to the proposed technique, this pairing is carried out by using communications means proper to a first communications terminal (for example a personal computer or a tablet, a games console, etc.) called a gateway communications terminal from which the authentication is initiated. In other words, a part of the authentication procedure (the one which consists for example in entering the password for access to a service) is implemented by a second communications terminal of the user in using third-party communications means which, for their part, are available from a first communications terminal called a gateway terminal. The gateway terminal as envisaged in the present document is not a router, an access point or an operator's box: these apparatuses cannot enable the user to get connected to a service (for example a website of an online business, restricted access site, etc.) and enter identifier/password type connection data. The gateway terminal is the terminal from which the authentication procedure is launched. The gateway terminal is the initiator of the authentication procedure.

More particularly again, in at least one embodiment of the proposed technique, a wireless communications interface (Bluetooth, Wi-Fi) is implemented by the user's second communications terminal to get connected with the authentication server in using the gateway communications terminal. This is, in a way, a parasite interface operation. In addition, combined with this use of an interface of the gateway communications terminal, the proposed technique furthermore comprises the setting up of a specific data transmission link between the authentication server and the second communications terminal.

The proposed technique is described with reference to FIG. 1.

A user (UTI) wishes to get connected to an online service such as a bank service. To this end, using a computer or a tablet (TCP#1), called a gateway terminal, he opens (50) an application (for example a browser) (this step is optional) and he asks (100) for a connection for authentication with an authentication server (ServA) (or else with the server of the service provider with which the user is connected by means of the gateway terminal [the server of the service provider then relays this request to the authentication server]). The connection request, transmitted by the gateway terminal or by a server to which the gateway terminal is connected enables the authentication server (ServA) to initiate the transaction and determine which device it must respond to.

The authentication server (ServA) transmits (110) to the gateway terminal (TCP#1) a request for identification (ReqId). The content of this request for identification is explained here below. The request for identification is optional. It serves for example to redirect the gateway terminal to a secured connection.

The gateway terminal (TCP#1) uses (120) the content of this identification request (ReqId) to request (121) the user for entry of an identifier (Id_U) (such as an electronic mail address). When the entry is made and validated by the user, this identifier (Id_U) is transmitted (122) by the gateway terminal (TCP#1) to the authentication server (ServA).

Upon reception of this identifier (Id_U), the authentication server (ServA) makes a search (130) within a database (BddPm) for at least one piece of data representing a connection parameter or parameter (PmC) of connection to a communications terminal (TCP#2). This data representing a connection parameter (PmC) is obtained by means of the providing of the identifier (Id_U) of the user. This data is then transmitted (140) to the gateway terminal (TCP#1) possibly accompanied by an instruction for building a virtual connection between the server (ServA) and the communication terminal (TCP#2).

The gateway terminal (TCP#1) receives this connection parameter (PmC) and, through this parameter, it instantiates (150) a data transmission/reception link with the user's communications terminal (TCP#2). For example, when a Bluetooth interface is used, the user's communications terminal (TCP#2) receives (160) from the gateway terminal (TCP#1), a request (ReqAp) for pairing with said gateway terminal (TCP#1), said pairing request (ReqAp) comprising data enabling a pairing with the user's communications terminal (TCP#2) by the Bluetooth interface. The content of the pairing request is explained here below. For example, when a Wi-Fi interface is used, the user's communications terminal (TCP#2) receives (160) from the gateway terminal (TCP#1), a request (ReqAp) for pairing with said gateway terminal (TCP#1), the pairing request (ReqAp) comprising data for pairing with the user's communications terminal (TCP#2) through the Wi-Fi interface. The wireless transmission interface between the user's communications terminal (TCP#2) and the gateway terminal (TCP#1) is of relatively little importance although the Bluetooth interface is a preferred solution in terms of implementation, the Bluetooth interface enables easier pairing of a smartphone type terminal with a PC or tablet type gateway terminal: it is not necessary to set up an ad hoc network with a Bluetooth interface Subsequently to the reception (160) of the pairing request (ReqAp) and the setting up of pairing with the gateway terminal (TCP#1), the user's communications terminal (TCP#2) makes a search (180) within an internal database and/or a secured storage space of the terminal for a piece of identification data (Id_S) of the authentication server (ServA). It compares (190) this piece of identification data (recorded within the terminal) with a piece of identification data received from the server. The identification data received from the server is either present within the pairing request (ReqAp) or transmitted (170) by the server after the pairing. This makes sure that the user's communications terminal will not suffer any hacking attempt by a third-party server or a fraudulent gateway communications terminal.

When the user's communications terminal (TCP#2) has checked the identity of the authentication server (ServA), the user's communications terminal (TCP#2) sends (200) the authentication server (ServA) a piece of authentication data (DataAuth).

Two possibilities are offered:
  either the user's communications terminal (TCP#2) transmits this piece of data by means of a complementary data connection available to the communications terminal (for example a 3G or 4G connection) in directly contacting the authentication server;
  or the user's communications terminal (TCP#2) transmits this piece of data by means of the connection made with the gateway terminal (TCP#1). In this latter case, at least one message is transmitted "over" the protocol used for the connection (for example "over Bluetooth" or "over Wi-Fi") intended for the authentication server. On a complementary basis, this message is transmitted in encrypted form in using a private key of the user's communications terminal (TCP#2).

Upon reception of this identification data (DataAuth), the authentication server (ServA) assigns (210) an assertion of authentication to the user (and therefore to the gateway terminal (TCP#1)).

Thus, the method described makes it possible not to have to enter a password to be able to carry out an authentication of a user with a service. The only piece of data required to be able to carry out the authentication is a login. Naturally, like any authentication method, the proposed method requires preliminary registration with the authentication server. This preliminary registration is described in detail here below.

The method described is based on the transmission of several requests. Only the requests specific to the technique described have been mentioned.

The identification request (ReqId) comprises for example an address (for example of a URL type) to which the gateway terminal (TCP#1) must get connected before providing any unspecified information. The connection parameters (PmC) include for example data needed for building a physical link between the user's communication terminal (TCP#2) and the gateway terminal (TCP#1). Among these pieces of data, there are especially the physical address (MAC address) of the user's communications terminal and possibly a piece of pairing code type data or Wi-Fi password type data. This data is transmitted to the user's communications terminal to enable direct connection between the user's communications terminal and the gateway terminal. In the case of a Bluetooth pairing code, this is the pairing code of the authentication server.

The pairing request (ReqAp) comprises at least one piece of data for identifying the authentication server (ServA). This piece of identification data (DIdServA) enables the user's communications terminal (TCP#2) to make sure of the identity of the device that is attempting to send it an authentication request. According to one particular embodiment, this identification data corresponds to an address (for example a MAC address) of the authentication server (ServA) encrypted through a public key of the user's communications terminal (TCP#2). The way in which the piece of information is made available to the authentication server (ServA) is described here below. According to one particular embodiment, this piece of identification data corresponds to an address (for example a MAC address) of the authentication server (ServA) encrypted by means of a private key of the authentication server (ServA). On an accessory basis, other pieces of identification data are also included, in order to increase security.

In other words, rather than carry out a pairing with the gateway terminal, an embodiment of the present disclosure makes it possible to carry out a pairing directly with the authentication server by using a data link "transported" by means of the gateway terminal. In the case of the Bluetooth for example, the user's communications terminal is paired via Bluetooth with the authentication server (and not with the gateway terminal). A Bluetooth link is set up not between the user's terminal and the gateway terminal (from which the user is trying to get connected) but actually between the authentication server and the user's terminal via the gateway terminal. Thus, the authentication server can relay Bluetooth packets to the gateway terminal, by means of a TCP/IP link. These Bluetooth packets will be sent (as such) by the gateway terminal (which is not capable of understanding their contents). This makes it possible to create a sort of very long-distance virtual Bluetooth channel between the user's terminal and the authentication server.

In reality, we therefore have a Bluetooth pairing duplicated with firstly a Bluetooth physical link set up between the communications terminal of the user and the gateway terminal and a functional Bluetooth link that is set up between the communications terminal of the user and the authentication server.

For the system to be functional, the gateway terminal limits itself to implementing a translation of Bluetooth addresses in order to accurately route the data which travels between the user's communications terminal and the authentication server. Thus, technically, the authentication server implements a functional stack corresponding to the protocol used (for example a Bluetooth functional stack or a Wi-Fi functional stack) while the gateway terminal naturally implements at least one hardware stack corresponding to the protocol used (for example a Bluetooth hardware stack or a Wi-Fi hardware stack). Naturally, the gateway terminal also implements a functional stack corresponding to the protocol used, which is driven by a dedicated module. More specifically, in the case of an implementation via Bluetooth, a "Scatternet" type network can be set up with the gateway terminal playing the role of a "slave node" while the user's communications terminal and the authentication server both play a "master node" role.

Naturally, it will be clear from reading this explanation that the proposed technique comprises two distinct parts: on the one hand a method implemented on the authentication server side and on the other hand a method implemented by the user's client terminal. These two methods have in common the use of a gateway terminal in order to set up a long-distance wireless data transmission link. Inasmuch as only a small part of the link is actually a wireless link, this wireless link can be called a virtual wireless link.

6.2. Parametrizing a Virtual Connection

In order to set up a connection between the user's communications terminal and the authentication server, it is worthwhile for the user's communications terminal and the authentication server to have hardware available for secured mutual recognition. More particularly, it is desirable for the user's communications terminal to have available at least one public key of the authentication server and for the authentication server to have available at least one public key of the user's communications terminal. The possession of these two items of hardware will enable the two entities to exchange data in secured form. In addition to these two elements, it is also desirable for the communications terminal to have available a piece of data to identify the authentication server and for the authentication server to have available a piece of data to identify the user's communications terminal.

To this end, several methods could be implemented. However, the inventors have had the idea of using a method of direct connection of the user's communications terminal with the authentication server. This direct connection is implemented either from a specific application which the user taken care to install beforehand on his communications terminal or by means of a web service accessible from the user's communications terminal. Whatever the means used to make this connection, it comprises the steps needed to exchange the above-mentioned data (or data used to obtain the above-mentioned data) used thereafter especially in the context of requests for identification and pairing.

In particular, in at least one embodiment, the public keys which are made available to the user's communications terminal on the one hand and to the authentication server on the other hand are used to derive some session keys from the implementing of one or more challenges during a mutual key-exchanging procedure.

This procedure for creating session keys is implemented after or concomitantly with the establishment of the link between the user's communications terminal and the authentication server. To implement this link, the gateway terminal is used only to transmit data on the physical channel (physical data transmission layer).

On a complementary basis, when the link is set up between the user's communications terminal and the authentication server, i.e. after the transmission by the gateway terminal of the user's identification data (identifier, electronic mail address, etc.), the authentication server implements a preparatory step in which it makes sure that the gateway terminal is truly capable of taking charge of the procedure for authenticating of the proposed technique. To this end, the server:

- checks that the gateway terminal truly possesses the physical interfaces needed to implement the link;
- checks that it can ask the gateway terminal for the implementation of these interfaces.

When the gateway terminal does not allow the authentication server to carry out these checks (for reasons of security for example), the authentication server requests the gateway terminal for the installation of an application, called a gateway application for the sake of convenience. This gateway application can for example take the form of a software module installed within the web browser used on the gateway terminal. This gateway application can also take the form of an application directly executable by the operating system of the gateway terminal (for example Windows™ or IOS™ or Android™). When this gateway application is installed, it is this application that carries out the above-mentioned checking operations on behalf of the authentication server.

On a complementary basis, when this application is installed in the gateway terminal, it is this application that takes charge of the relay function for transmitting data between the user's communications terminal and the authentication server. To this end, the application delivered by the authentication server itself comprises cryptographic hardware sufficient to ensure the confidentiality of the data relayed.

6.3. Description of One Case of Use

In this case of use, we present the use of the proposed technique in order to carry out a financial transaction on an e-commerce site. In this case of use, the user's communications terminal is a smartphone (in which a specific application is installed), the gateway terminal is a laptop PC type computer and the authentication server is a bank server (it may be a physical bank server or a software bank server intended solely to carry out authentication). A fourth entity comes into play in this case of use: it is the server of the e-commerce site which is used for the purchases made by the user.

Prior to the application of the proposed technique, it is assumed that the user has selected at least one article on the website in question and has put it in his purchasing basket and wishes to make a payment transaction to pay for his purchases.

When the user wishes to make payment, the following procedure is implemented, in compliance with the steps described here above:

- through the gateway terminal, in a field designed for this purpose, on the merchant's website to which he is connected, the user enters the identifier needed for his authentication on the site in question;
- the website sends to the bank server the identifier entered by the user and re-directs (HTTP re-direct operation for example) this message towards a payment page of the bank server. From this moment onwards, the gateway terminal is connected to the bank server.
- the bank server, jointly with the gateway terminal, sets up a Bluetooth connection with the user's smartphone as explained here above. When the user's smartphone is not present (i.e. when it is not in a radius of Bluetooth data transmission/reception in relation to the gateway terminal), the authentication procedure cannot continue and the transaction is cancelled. This makes sure that the user is truly present. This is why the choice of Bluetooth technology is preferred, owing to its relatively small transmission range of a few meters. If the smartphone is present, then an application specific to the described technique is implemented on the smartphone to enable it to get authenticated with the bank server. This application implements the steps of the method that must be executed by the user's communications terminal. Optionally, in order to increase security, the application requests the user to enter a personal identification code (which, for example but not necessarily, may be a personal identification code identical to the one used for the user's bankcard). When such an option is being implemented then, if the personal identification code is not entered within a predetermined time after the application transmits the code entry request to the user, the transaction is cancelled.
- when the user's smartphone has been authenticated, the bank server considers the user to be really the person he is claiming to be and implements the financial transaction.

Accessorily, since the authentication server is assured of the authenticity of the user's identity, it does not ask for entry of information on the bankcard: it uses the bankcard associated with the user's account by his bank, when this information is available of course. Optionally, the e-commerce site transmits the information on the bankcard to be used directly to the bank server, when redirecting to the bank server. Thus, the user is not obliged to enter the data of his bankcard whenever he wishes to make a payment.

Thus, in addition to the fact that it is no longer necessary to enter a password to access a service, it is moreover not necessary to enter bank information to access this service.

6.4. Other Characteristics and Advantages

Referring to FIG. 2, we describe an authentication server implemented to authenticate a user from a communications terminal (TCP#2) different from an initial communications terminal according to the procedure described here above.

For example, the authentication server comprises a memory 31 constituted by a buffer memory, a processing unit 32, equipped for example with a microprocessor and driven by the computer program 33 implementing a method of authentication of a communications terminal. At initialization, the code instructions of the computer program 33 are for example loaded into a memory and then executed by the processor of the processing unit 32. The processing unit 32 inputs at least one piece of data representing a user identifier, from the gateway terminal. The microprocessor of the processing unit 32 implements the steps of the authentication method according to the instructions of the computer program 33 to obtain the data needed to set up a virtual link between the terminal of the user and the authentication server in order to exchange, with the user's communications terminal, the data needed for his authentication.

To this end, the authentication server comprises, in addition to the buffer memory 31, communications means such as network communications modules, data transmission means and if necessary, an encryption processor.

These means take the form of a particular processor implemented within the device, said processor being a secured processor. According to one particular embodiment, this device implements an application or a particular module that is in charge of carrying out processing operations, this application or this module being for example provided by the manufacturer of the processor in question in order to enable the use of said processor. To this end, the processor comprises unique identification means. These unique identification means ensure the authenticity of the processor and/or of the authentication server.

Besides, the authentication server also comprises means of searching, within a database, for data for connection to the user's terminal as well as means for obtaining encryption keys, for example asymmetrical encryption keys (public keys/private keys) used to generate verification data and counter-verification data during the authentication. These means also take the form of communications interfaces enabling data exchange on the communications network, means of interrogation and of updating databases, etc.

Referring to FIG. 3, a description is provided of a user's communications terminal (TCP#2) implemented to authenticate a user, who is preliminarily identified by means of a gateway terminal (TCP#1) according to the method described here above.

For example, a user's communications terminal comprises a memory 41 constituted by a buffer memory, a processing unit 42, equipped for example with a microprocessor and driven by the computer program 43 implementing a method of authentication.

At initialization, the code instructions of the computer program 43 are for example loaded into a memory and then executed by the processor of the processing unit 42. The processing unit 42 inputs at least one piece of data representing a pairing command for pairing with the gateway terminal (TCP#1). The microprocessor of the processing unit 42 implements the steps of the authentication method according to the instructions of the computer program 43 to receive a request for pairing from the gateway terminal (TCP#1), make a search, within an internal database and/or a secured storage space, for a piece of identification data of the authentication server (ServA), compare this piece of identification data with a piece of identification data received from the server (for example within the pairing request), transmit a piece of authentication data (DataAuth) to the authentication server (ServA).

To this end, the user's communications terminal comprises, in addition to the buffer memory 41, communications means such as network communications modules, data transmission means and, if necessary, an encryption processor.

These means can take the form of a particular processor implemented within the device, this processor being a secured processor. According to one particular embodiment, this user's communications terminal implements an application or a particular module that is in charge of carrying out exchanges, this application or this module being for example provided by the manufacturer of the processor in question (implemented within the terminal) in order to enable the use of said processor. To this end, the processor comprises unique identification means. These unique identification means make sure of the authenticity of the processor and/or of the communications terminal.

Besides, a user's communications terminal additionally comprises means for storing a piece of reference data of the servers' identity and means for storing encryption keys. These means also take the form of communications interfaces for exchanging data on communications networks, interrogation means and database updating means, etc.

Referring to FIG. 4, we describe a gateway communications terminal (TCP#1) implemented to authenticate a user from a communications terminal (TCP#1) according to the method described here above.

For example, a user's communications terminal comprises a memory 51 constituted by a buffer memory, a processing unit 52, equipped for example with a microprocessor and driven by the computer program 53 implementing a method of authentication.

At initialization, the code instructions of the computer program 53 are for example loaded into a memory and then executed by the processor of the processing unit 52. The processing unit 52 inputs at least one piece of data representing an identity of a user (for example a login). The microprocessor of the processing unit 52 implements the steps of the authentication method according to the instructions of the computer program 53 to transmit this identity to an authentication server; receive, from this authentication server, a parameter of connection to the user's communications terminal (TCP#2); set up a connection between itself and the communications terminal of the user (TCP#2) by means of the parameter received beforehand in transmitting a pairing request to the terminal and possibly an identity of the authentication server and receive, from the authentication server, an assertion of authentication when the authentication between the communications terminal (TCP#2) and the authentication server has taken place accurately.

To this end, a user's communications terminal comprises, in addition to the buffer memory 51, communications means such as network communications modules, data transmission means and if necessary an encryption processor.

These means can take the form of a particular processor implemented within the device, said processor being a secured processor. According to one particular embodiment, this communications terminal of a user implements a particular module which is in charge of carrying out exchanges (especially exchanges needed to implement the virtual connection between the communications terminal TCP#2 and the authentication server ServA), this module being for example provided by the manufacturer of the processor in question in order to enable the use of said processor. To this end, the processor comprises unique identification means. These unique identification means ensure the authenticity of the processor and/or of the gateway communications terminal for purposes of preventing identity theft.

Besides, the user's communications terminal also comprises means for storing a piece of reference data of the identity of the server and means for storing encryption keys. These means also take the form of a communications interfaces enabling the exchange of data on communications networks, means of interrogation and database updating means, etc.

Although the present disclosure has been described with reference to one or more examples, workers skilled in the art will recognize that changes may be made in form and detail without departing from the scope of the disclosure and/or the appended claims.

The invention claimed is:

1. A method comprising:
authenticating a communications terminal belonging to a user with an authentication server connected to a gateway terminal by using a communications network, wherein the method comprises the following acts performed by the authentication server:
obtaining a piece of data representing an identity of the user from said gateway terminal;
carrying out a checking operation, directly or through a gateway application installed on said gateway terminal, to determine whether or not said gateway terminal comprises a Bluetooth physical interface;
and in response to determining that said gateway terminal comprises a Bluetooth physical interface:
configuring, by said authentication server, a data transmission link between said authentication server and said user's communications terminal, by using said Bluetooth physical interface of said gateway terminal and as a function of said piece of data representing an identity of the user, said data transmission link being a virtual Bluetooth link set up by transmitting a Bluetooth pairing code of the authentication server to the user's communications terminal, enabling pairing the user's communications terminal directly with the authentication server;
transmitting, by the authentication server, to the user's communications terminal, a piece of encrypted data for checking authentication, by using the data transmission link;
receiving, by the authentication server, coming from the user's communications terminal, a piece of encrypted data for counter-checking of authentication; and
issuing an assertion of authentication of the user in response to the piece of encrypted data for counter-checking of authentication corresponding to said piece of encrypted data for checking authentication.

2. The method according to claim 1, wherein, prior to the act of obtaining a piece of data representing an identity of the user, said method comprises:
receiving a request for connection from said gateway terminal or from a server connected to said authentication server; and
transmitting, to said gateway terminal, a request for identification as a function of said request for connection.

3. The method according to claim 1, wherein the act of configuration by said authentication server of a data transmission link between said authentication server and said user's communications terminal comprises:
obtaining at least one piece of data representing at least one parameter of connection to the communications terminal by using said piece of data representing said identity of the user;
transmitting said at least one piece of data representing a parameter of connection to said gateway terminal.

4. The method according to claim 3, wherein said at least one parameter of connection comprises at least one piece of data necessary for building the link between the communications terminal of the user and the gateway terminal.

5. The method according to claim 3, wherein said at least one parameter of connection comprises at least one piece of data belonging to a group consisting of:
a physical address of the user's communications terminal;
a pairing code type piece of data;
a password type piece of data.

6. A server for authenticating a communications terminal belonging to a user with an authentication server connected to a gateway terminal by using a communications network wherein the server comprises:
a data processor; and
a non-transitory computer-readable medium comprising instructions stored thereon, which when executed by the processor configure the server to:
obtain a piece of data, from said gateway terminal, representing an identity of the user;
carrying out a checking operation, directly or through a gateway application installed on said gateway terminal, to determine whether or not said gateway terminal comprises a Bluetooth physical interface;
and in response to determining that said gateway terminal comprises a Bluetooth physical interface:
configure a data transmission link between said authentication server and said user's communications terminal, by using said Bluetooth physical interface of said gateway terminal and as a function of said piece of data representing an identity of the user, said data transmission link being a virtual Bluetooth link set up by transmitting a Bluetooth pairing code of the authentication server to the user's communications terminal, enabling pairing the user's communications terminal directly with the authentication server;
transmit, to the user's communications terminal, a piece of encrypted data for checking authentication by using the data transmission link;
receive a piece of encrypted data for counter-checking of authentication from the user's communications terminal; and
issue an assertion of authentication of the user in response to the piece of encrypted data for counter-checking of authentication corresponding to said piece of encrypted data for checking authentication.

7. A non-transitory computer-readable medium comprising program code instructions stored thereon to execute an operation for authenticating when the instructions are executed by a processor of an authentication server, wherein the operation comprises:
authenticating a communications terminal belonging to a user with the authentication server connected to a gateway terminal by using a communications network, wherein the authenticating the communications terminal comprises the following acts performed by the authentication server:
obtaining a piece of data representing an identity of the user from said gateway terminal;
carrying out a checking operation, directly or through a gateway application installed on said gateway terminal, to determine whether or not said gateway terminal comprises a Bluetooth physical interface;
and in response to determining that said gateway terminal comprises a Bluetooth physical interface:
configuring, by said authentication server, a data transmission link between said authentication server and said user's communications terminal, by using said Bluetooth physical interface of said gateway terminal and as a function of said piece of data representing an identity of the user, said data transmission link being a virtual Bluetooth link set up by transmitting a Bluetooth pairing code of the authentication server to the user's communications terminal, enabling pairing the user's communications terminal directly with the authentication server;

transmitting, by the authentication server, to the user's communications terminal, a piece of encrypted data for checking authentication, by using the data transmission link;

receiving, by the authentication server, coming from the user's communications terminal, a piece of encrypted data for counter-checking of authentication; and issuing an assertion of authentication of the user in response to the piece of encrypted data for counter-checking of authentication corresponding to said piece of encrypted data for checking authentication.

* * * * *